United States Patent
Yamane

(10) Patent No.: US 6,300,975 B1
(45) Date of Patent: Oct. 9, 2001

(54) IMAGE PICKUP APPARATUS

(75) Inventor: Akira Yamane, Nagoya (JP)

(73) Assignee: Elmo Co., Ltd., Aichi (JP)

( * ) Notice: Subject to any disclaimer, the term of this patent is extended or adjusted under 35 U.S.C. 154(b) by 0 days.

(21) Appl. No.: 09/173,093

(22) Filed: Oct. 14, 1998

(30) Foreign Application Priority Data

Oct. 15, 1997 (JP) .................................................. P9-297700

(51) Int. Cl.$^7$ ...................................................... H04N 7/18
(52) U.S. Cl. ............................ 348/63; 348/370; 353/122
(58) Field of Search .............................. 348/61, 63, 110, 348/112, 136, 15, 370, 373; 353/101, 122, 42; 345/182, 183; 434/428

(56) References Cited

U.S. PATENT DOCUMENTS

| | | | |
|---|---|---|---|
| 5,642,206 | * | 6/1997 | Yamamori et al. ............... 348/370 |
| 5,734,417 | * | 3/1998 | Yamamoto et al. ................ 348/61 |
| 5,738,429 | * | 4/1998 | Tagawara et al. ................ 353/122 |
| 5,863,209 | * | 1/1999 | Kim ................................ 348/373 |
| 6,064,426 | * | 5/2000 | Waterman .......................... 348/63 |
| 6,065,839 | * | 5/2000 | Miyata et al. .................... 353/122 |

* cited by examiner

Primary Examiner—Chris Kelley
Assistant Examiner—Gims Philippe
(74) Attorney, Agent, or Firm—Koda & Androlia

(57) ABSTRACT

An image pickup apparatus includes a video camera shooting a material placed on a stage to obtain an image signal delivered to an external reproducing equipment and a column for supporting the video camera so that the video camera is located over a central portion of the stage. The column is formed into a vertical two-stage structure including an upper column and a lower column. The video camera is located over the central portion of the stage when the lower column is rotated to stand and the upper column is extended straightforward from the lower column. The upper column is rotated so as to be folded at right angles to the lower column when an object in the rear of the stage is shot by the video camera. When the apparatus is folded, the lower column is brought down to lie along the stage and the upper column is folded relative to the lower column.

3 Claims, 9 Drawing Sheets

IMAGE PICKUP APPARATUS

BACKGROUND OF THE INVENTION

1. Field of the Invention

This invention relates to an image pickup apparatus including a stage on which a material such as a chart, diagram, pamphlet, publications, or model, a video camera mounted on a column to be located over a central portion of the stage and picking up an image of the material to obtain image signals, which are delivered to an image reproducer such as a television, video projector, etc.

2. Description of the Prior Art

In conventional image pickup apparatus of the above-described type, the video camera is rotatably mounted on an upper end of the column so as to be capable of taking an image of an object located in the rear of the stage as well as the material placed thereon. The column is rotatable between a position where it stands from the stage and another position where it is lying along the stage. Furthermore, the column has a vertical two-stage structure including an upper column and a lower column. The upper column is inserted into a lower column so that the column is telescopic. In use of the image pickup apparatus, the column is caused to stand from the stage and extended so that the video camera mounted on the upper end thereof is held at a predetermined height over the central portion of the stage. When the apparatus is not used, the column is contracted so as to be lying along the stage together with the video camera. Thus, the column can compactly be folded.

The image pickup apparatus further includes an inner illumination lamp for illuminating the material from inside the stage and a pair of right-hand and left-hand outer illumination lamps for illuminating the material from outside the stage. The outer illumination lamps are supported on a pair of arms so as to be located over the stage.

The conventional image pickup apparatus thus comprises a rotating mechanism for rotating the column so that the column is caused to stand up and lie along the stage for the purposes of being compactly folded and being capable of picking up the image of an object located in the rear of the stage. The image pickup apparatus further comprises a mechanism for telescoping the column and a mechanism for rotating the video camera mounted on the upper end of the column. These three mechanisms complicate the construction of the image pickup apparatus, resulting in an increase in a manufacturing cost of the apparatus.

Moreover, the column has a proximal end mounted on an intermediate of one of opposed side edges of the stage. The arms supporting the respective outer illumination lamps are also mounted on the side edge of the stage. As a result, the column and the arms reduce a space of the stage on which the material can be placed.

SUMMARY OF THE INVENTION

Therefore, an object of the present invention is to provide an image pickup apparatus which has a simple construction and yet can pick up the image of the object located in the rear of the stage, and which can compactly be folded when not used.

Another object of the invention is to provide an image pickup apparatus which can increase an effective space of the stage on which the material is placed.

The present invention provides an image pickup apparatus comprising a stage on which a material is placed, a video camera including a lens and shooting an image of the material placed on the stage, thereby obtaining an image signal representative of the material, the image signal being delivered to an image reproducing unit, and a column for supporting the video camera so that the video camera is located over a central portion of the stage, the column being formed into a vertical two-stage structure including an upper column and a lower column. The upper column has a distal end to which the video camera is fixed. The lower column is mounted on the stage so as to be pivotally moved between a standing position where the lower column stands from the stage and a lying position where the lower column is lying along the stage. The upper column is rotatably mounted on the lower column. The image pickup apparatus further comprises first to third positioning means. The first positioning means is provided for positioning the upper column at a first position where the upper column extends substantially straightforward from the lower column. The second positioning means is provided for positioning the upper column at a second position where the upper column is bent approximately at right angles to the lower column. The third positioning means is provided for positioning the upper column at a third position where the upper column is folded into two parts relative to the lower column. In the image pickup apparatus, the lens of the video camera is directed to the central portion of the stage when the lower column is positioned at the standing position and the upper column is positioned at the first position. Furthermore, the lens of the video camera is directed to the rear of the stage when the lower column is positioned at the standing position and the upper column is positioned at the second position. Additionally, the video camera is lying along the stage when the lower column is positioned at the lying position and the upper column is positioned at the third position.

According to the above-described image pickup apparatus, the vide camera can be held at a predetermined height over the central portion of the stage when the lower column is caused to stand and the upper column is caused to extend straightforward from the lower column. Furthermore, the video camera can take the image of an object located in the rear of the stage when the upper column is moved to the position where the upper column is bent approximately at right angles to the lower column. Additionally, the apparatus can compactly be folded when the upper column is folded into two parts relative to the lower column and the lower column is caused to lie along the stage. Thus, the invention provides a pivotally moving mechanism for pivotally moving the lower column relative to the stage and a moving mechanism for moving the upper column relative to the lower column. By these moving mechanisms, the video camera can take the image of the object located in the rear of the stage, and the apparatus can compactly be folded. Consequently, the structure of the image pickup apparatus can be simplified and accordingly, the manufacturing cost thereof can be reduced.

In a preferred form, the lower column is mounted on a corner of the stage. Consequently, an effective space of the stage for the material can be prevented from being reduced by the column.

In another preferred form, the image pickup apparatus further comprises a pair of arms mounted on rear opposite corners of the stage respectively, each arm having a proximal end moved between a standing position and a folded position, and a pair of external illumination lamps fixed on the distal ends of the arms for illuminating the material on the stage, respectively. In this construction, each external lamp is located over and outside the stage when each arm is positioned at the standing position and each external lamp is lying along the stage when each arm is positioned at the folded position. Since the proximal ends of the arms supporting the external illumination lamps are mounted on the opposite corners of the stage, the effective space of the stage for the material can further be prevented from being reduced by the arms.

BRIEF DESCRIPTION OF THE DRAWINGS

Other objects, features and advantages of the present invention will become clear upon reviewing the following description of the preferred embodiment, made with reference to the accompanying drawings, in which.

DETAILED DESCRIPTION OF THE PREFERRED EMBODIMENT

Figure 1:
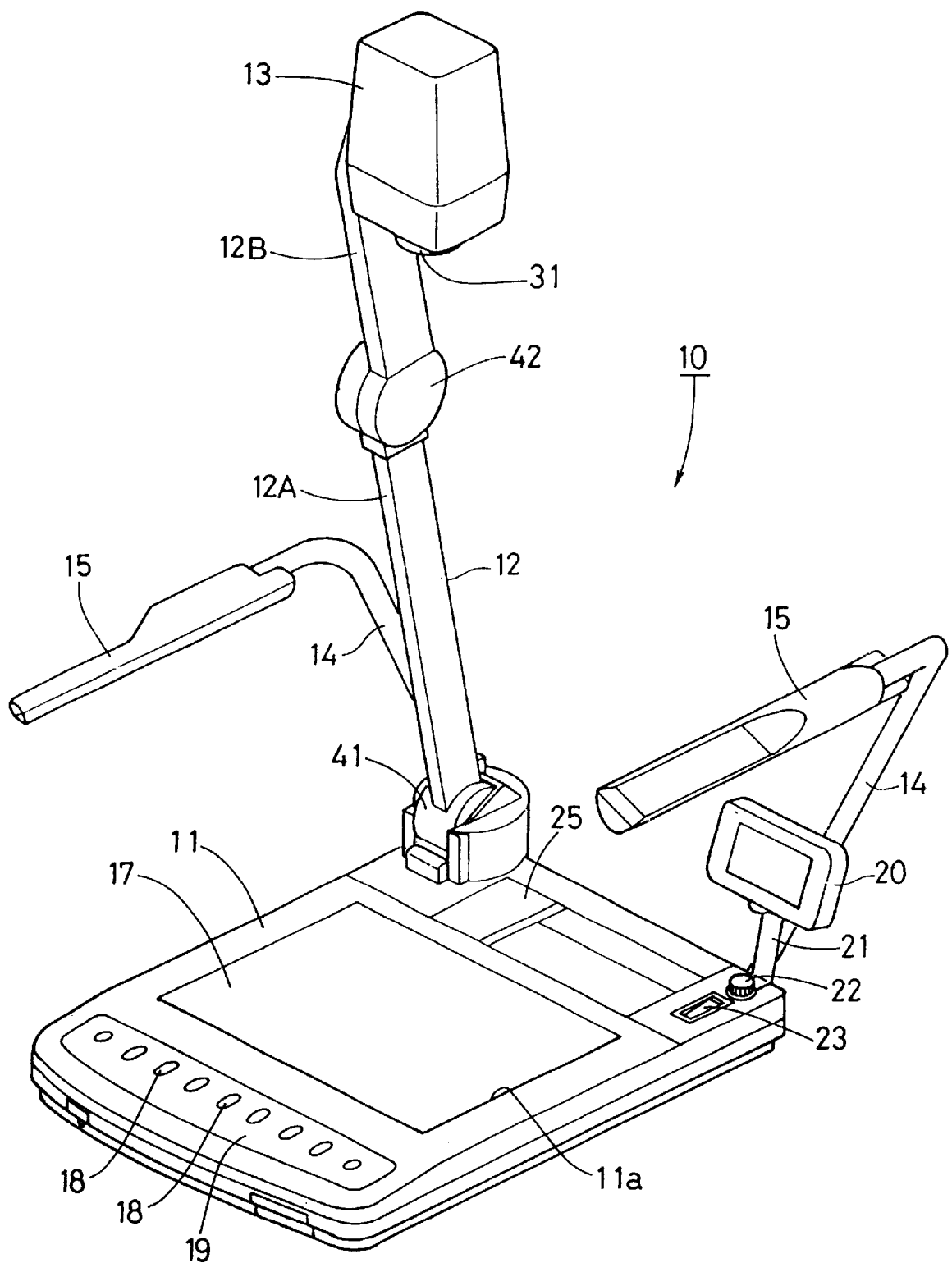
FIG. 1 is a perspective view of the image pickup apparatus of one embodiment in accordance with the present invention, showing one mode of use.

One embodiment of the present invention will be described with reference to the accompanying drawings. Referring to FIGS. 1 to 4, an image pickup apparatus 10 of the embodiment in accordance with the invention is shown. The image pickup apparatus 10 comprises a generally rectangular flat box-shaped stage 11 on which a material such as a chart, diagram, slide film, catalog, pamphlet, or model is placed. The apparatus 10 also comprises a column 12 standing from a corner in the rear of the stage 11 and a main video camera 13 mounted on the column 12 to be located over a central portion of the stage 11. The apparatus 10 further comprises a pair of arms 14 mounted on both ends of the rear side of the stage 11, a pair of external illumination lamps 15 mounted on the respective arms 14 for illuminating the material on the stage 11, and a small-sized auxiliary video camera 16 disposed near a root portion of the column 12.

The stage 11 has a rectangular central opening 11a covered with a milk white translucent diffusion plate 17 made of an acrylic resin. The diffusion plate 17 forms a stage face. An internal illumination lamp (not shown) is provided in the stage 11 for illuminating a transparent material such as film through the diffusion plate 17. An operation panel 19 is mounted on a downwardly inclined front face of the stage 11. The operation panel 19 includes various operation switches 18. A monitor television 20 is detachably attached by a bracket 21 and a screw 22 to the rear corner opposite the column 12. A main switch 23 is provided in a recess formed in the vicinity of the monitor television 20.

Figure 2:
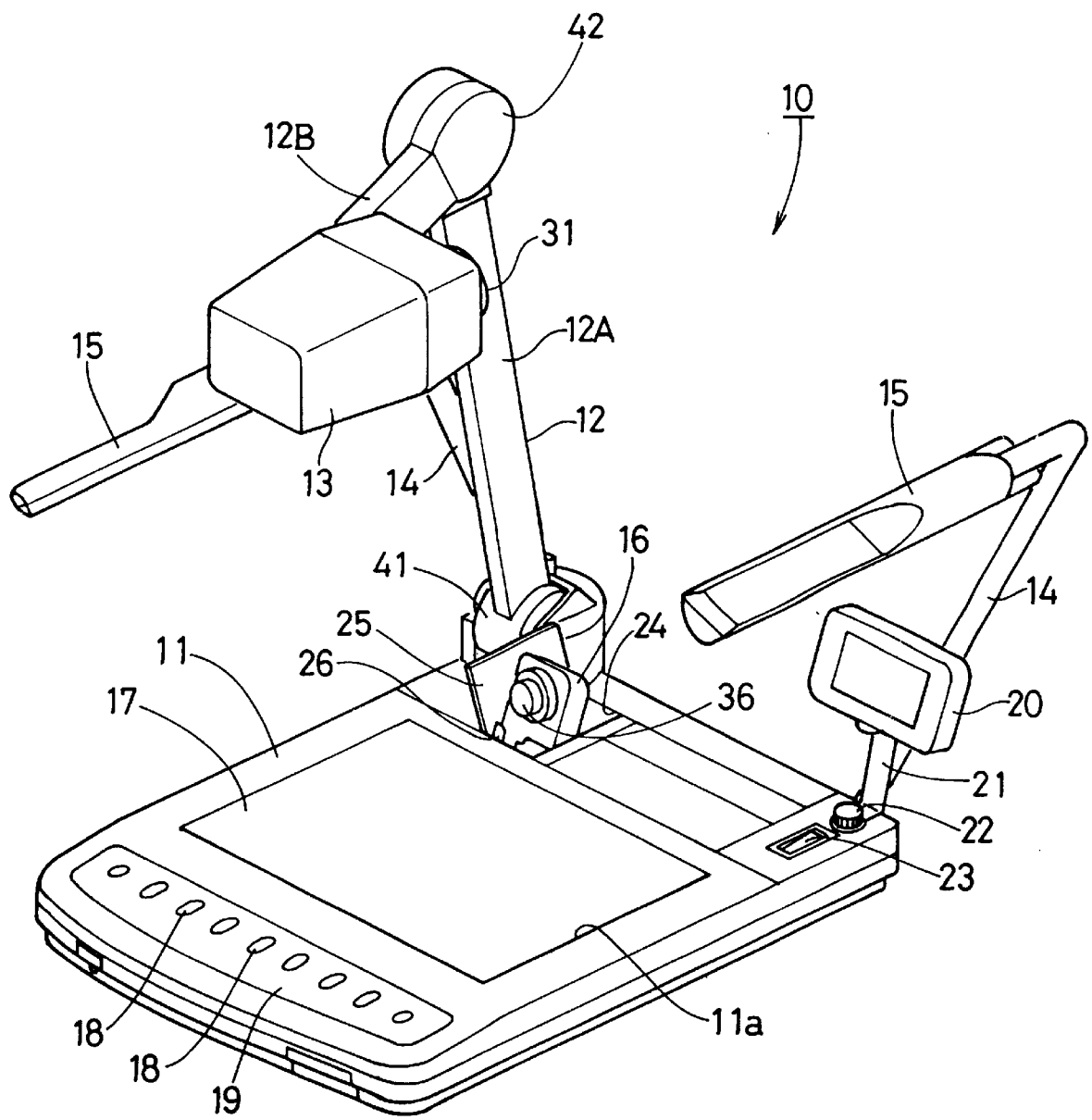
FIG. 2 is also a perspective view of the image pickup apparatus in another mode of use.
Figure 3:
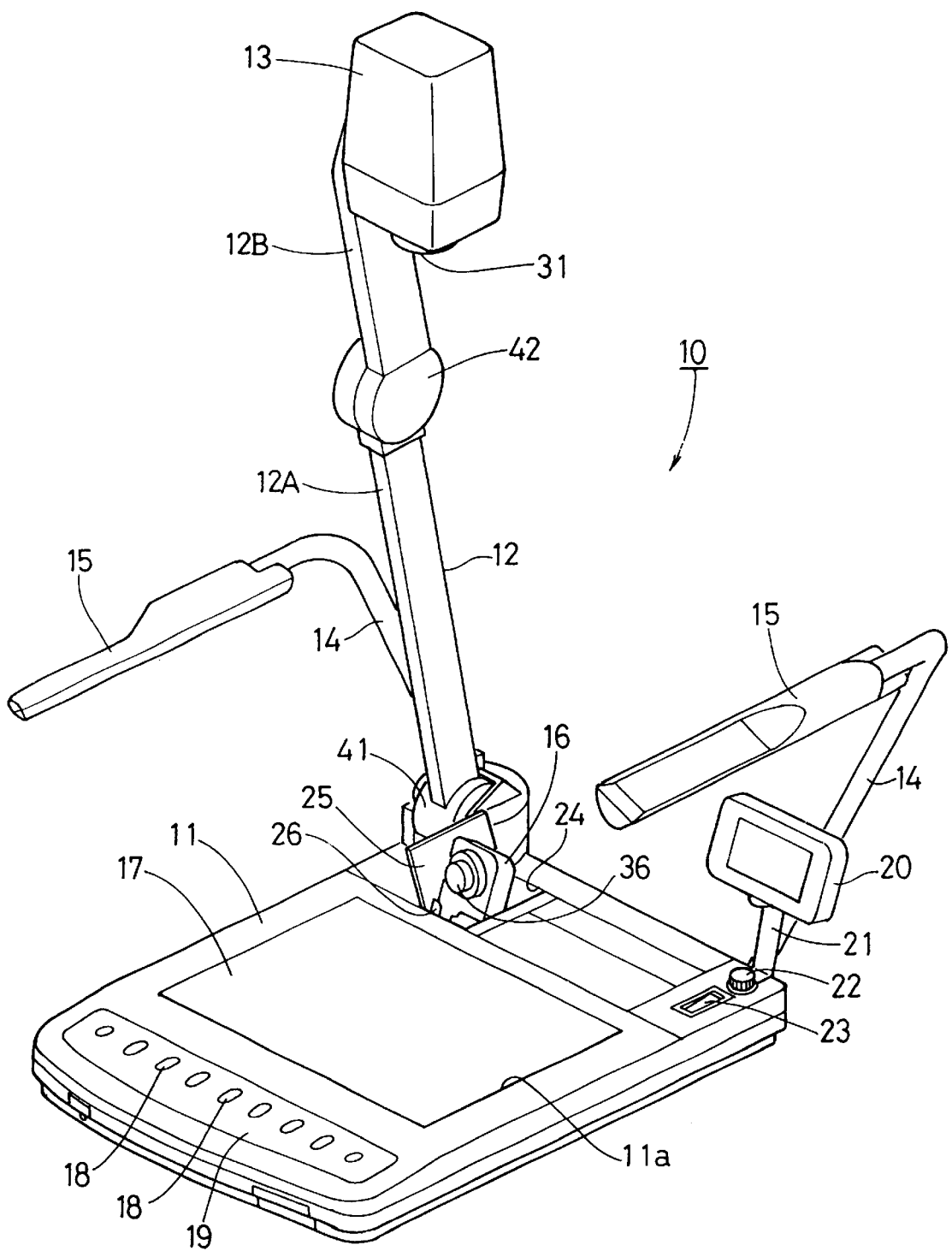
FIG. 3 is further a perspective view of the image pickup apparatus in further another mode of use.
Figure 4:
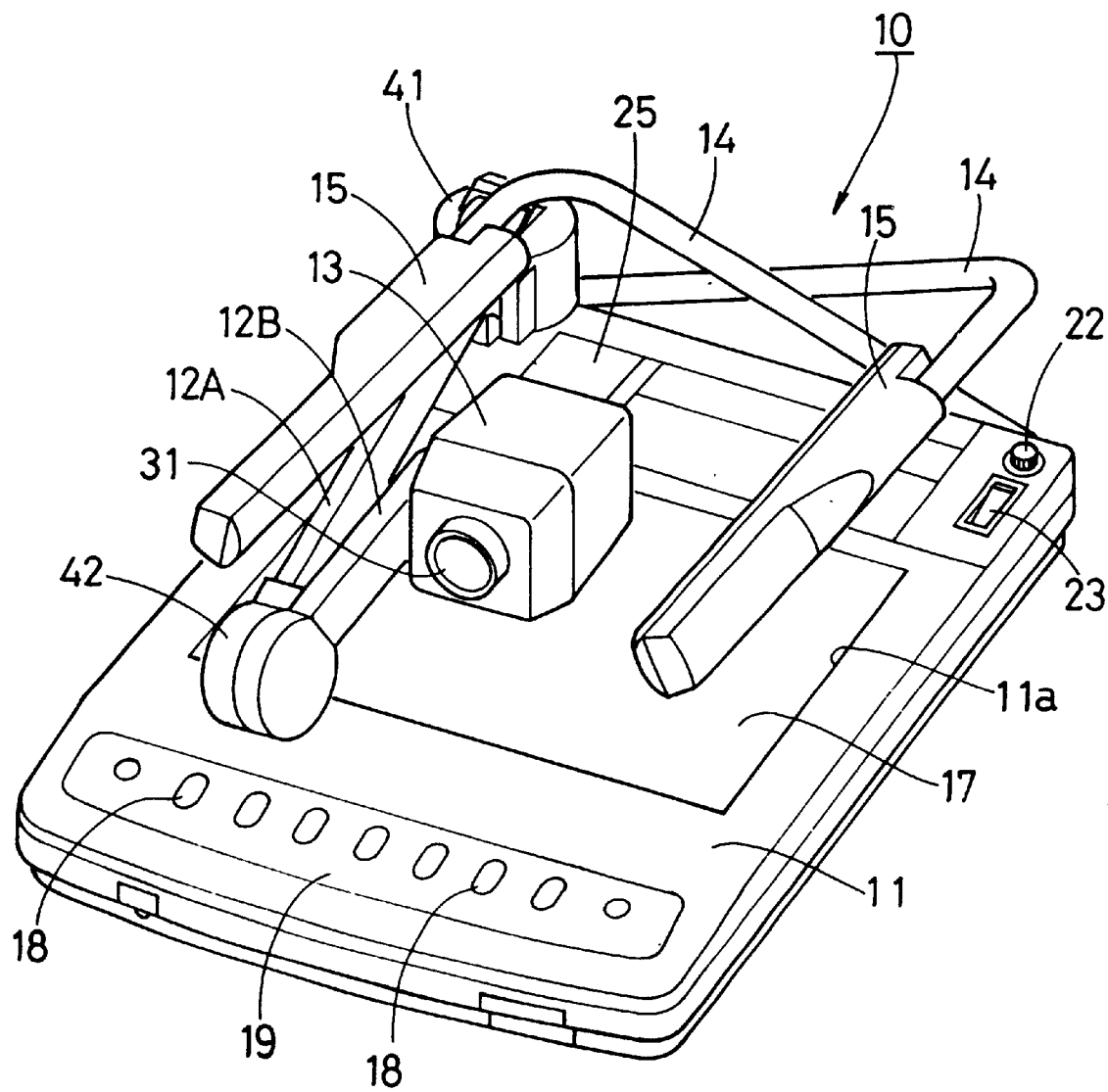
FIG. 4 is a perspective view of the image pickup apparatus in the folded state.

Each arm 14 is pivotally movable between a standing position as shown in FIGS. 1 to 3 and a folded position as shown in FIG. 4. When assuming the standing position, each arm 14 stands from the rear side of the stage 11 to hold the corresponding external illumination lamp 15 so that the lamp is located at an obliquely upward position with respect to the stage 11. When each arm 14 assumes the folded position, the corresponding external lamp 15 is lying along the stage 11. Each arm 14 is locked at both positions by a locking mechanism (not shown).

A recess 24 open to the stage face is formed in the vicinity of the root portion of the column 12. A cover 25 is provided for closing and opening the recess 24. As shown in FIG. 1, when the cover 25 is closed, an upper face of the cover 25, the diffusion plate 17 and the upper face of the stage 11 around the diffusion plate 17 are planar with one another, thereby constituting the stage 11. Thus, the stage 11 is formed into a flat face over its entirety. Furthermore, the column 12, the arms 14 and the bracket 21 are disposed at the corners of the stage 11. Accordingly, the material placed on the stage 11 can be slid thereon freely leftward and rightward, and forward and backward to be moved outside the stage.

Figure 5:
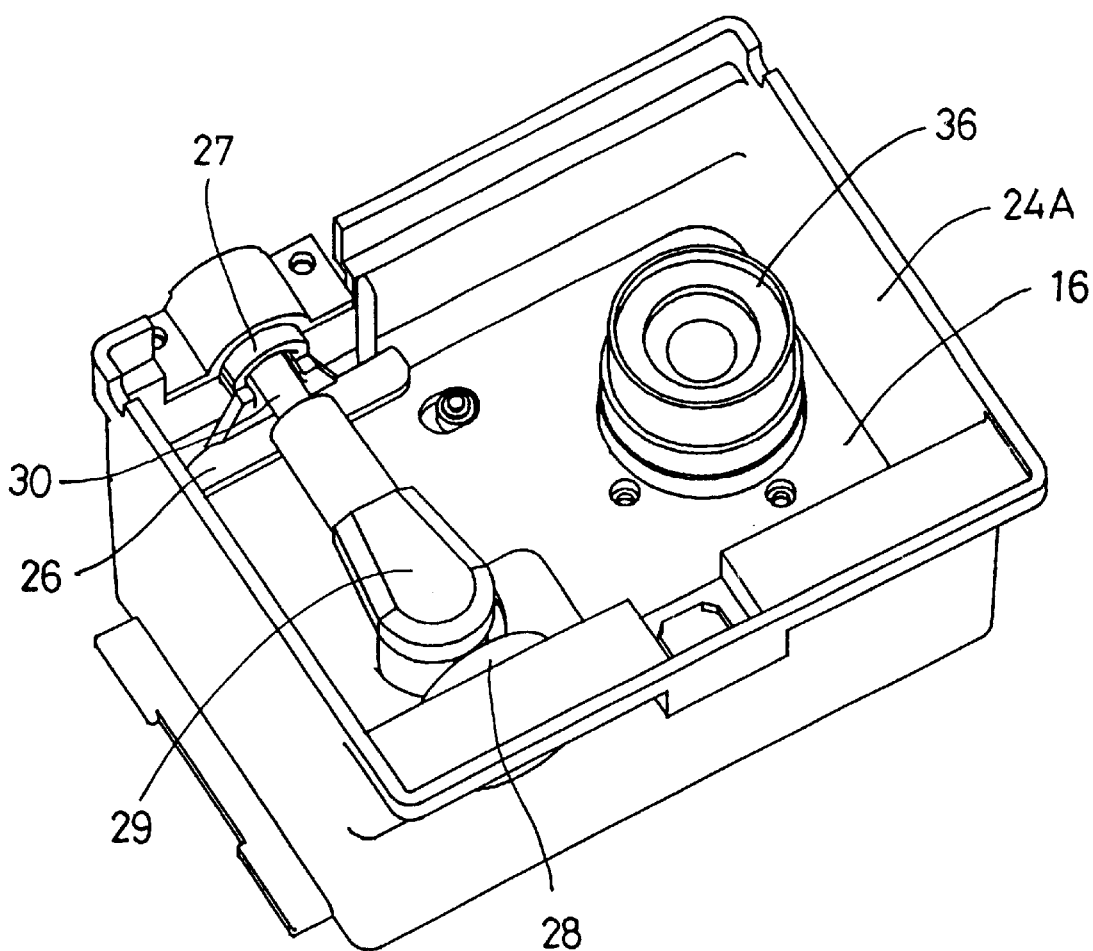
FIG. 5 is a partially enlarged perspective view of a auxiliary video camera of the image pickup apparatus in a housed state.
Figure 6:
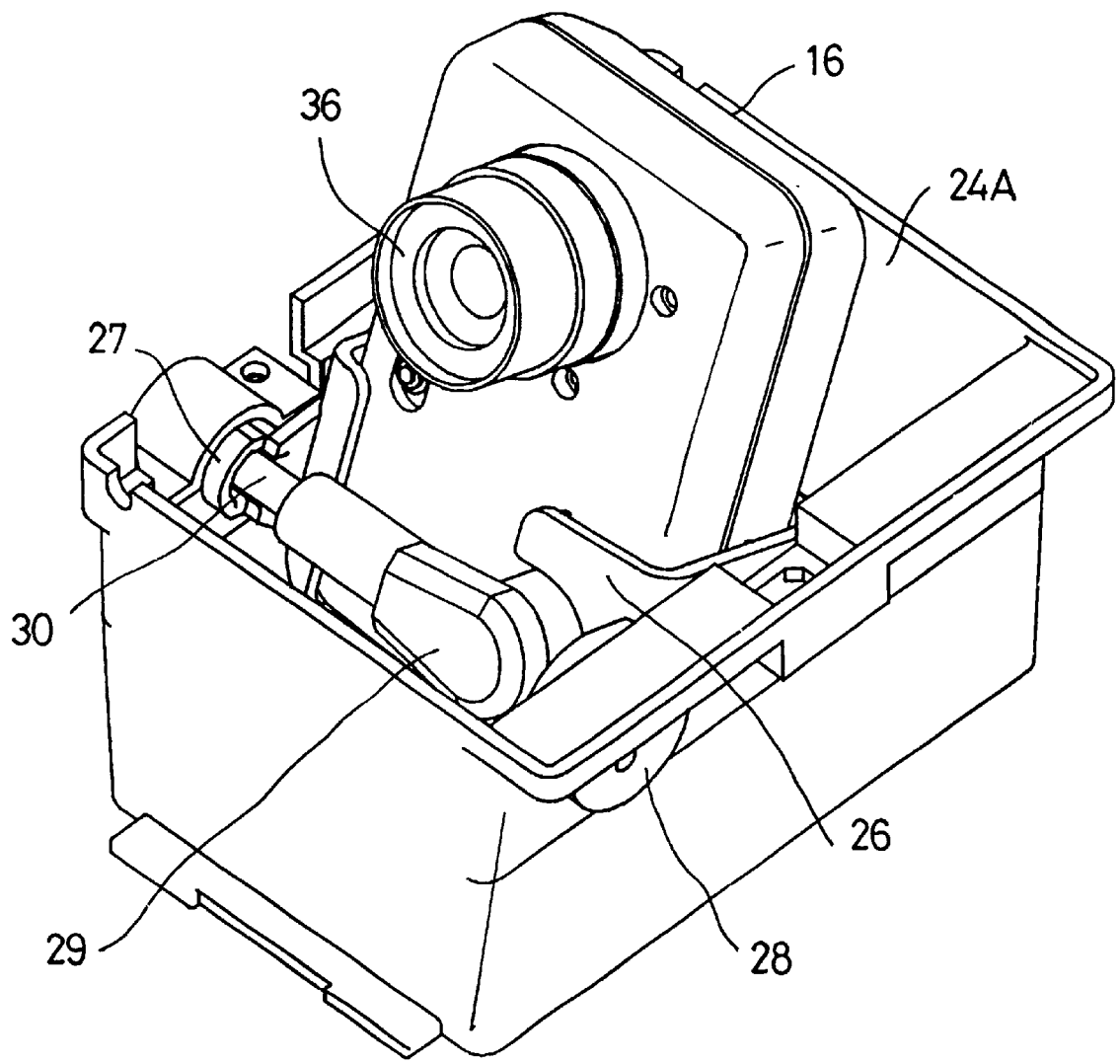
FIG. 6 is a partially enlarged perspective view of the auxiliary video camera in a standing state.
Figure 7:
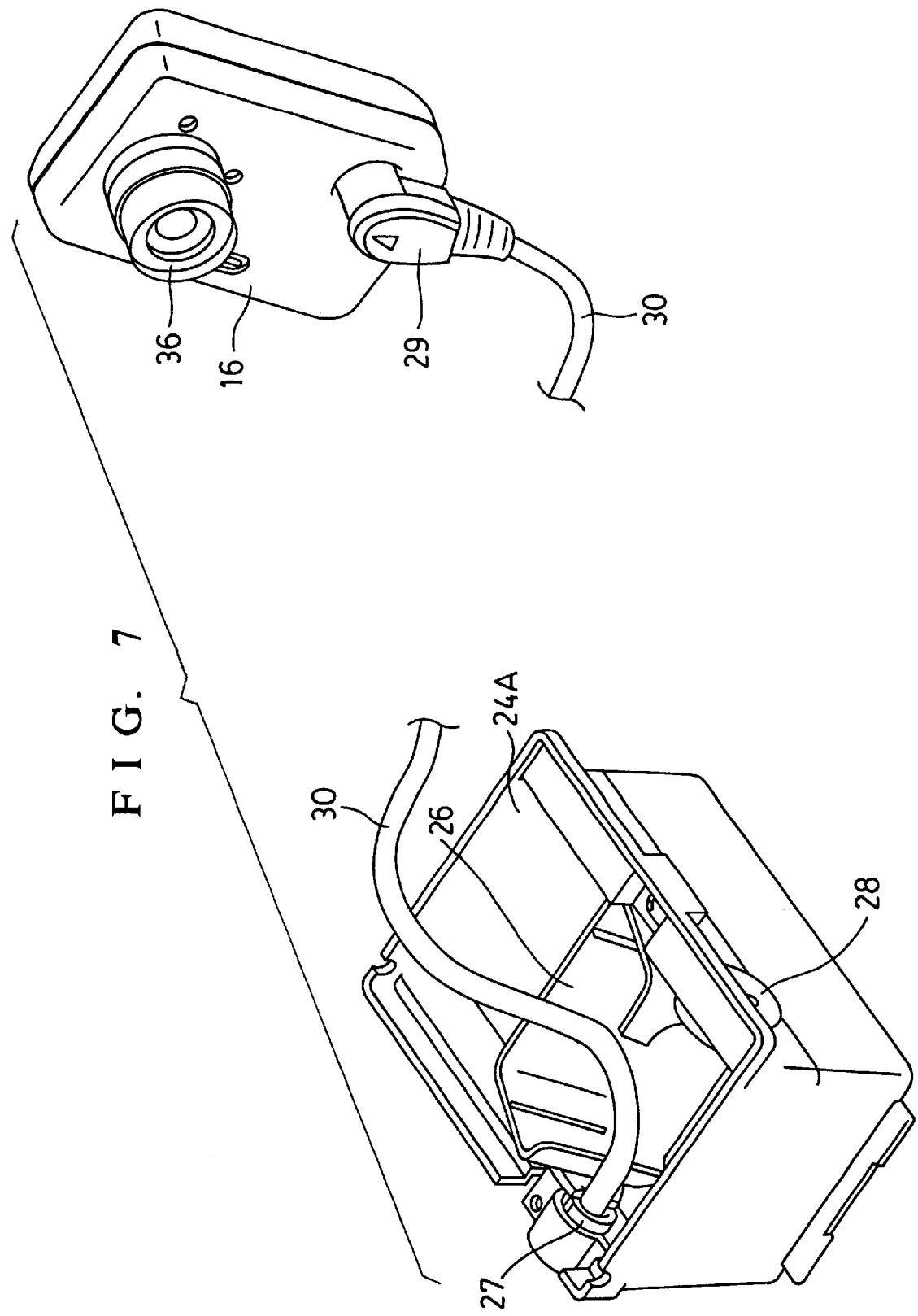
FIG. 7 is a partially enlarged perspective view of the auxiliary video camera taken out of the housing section.

A box 24A is accommodated in the recess 24 as shown in FIGS. 5 to 7. In the box 24A is provided a casing 26 for accommodating a lower half of the auxiliary video camera 16. The casing 26 has two shafts 27 and 28 integrally formed on right-hand and left-hand walls thereof respectively. The casing 26 is vertically rotatably mounted via the shafts 27 and 28 on right-hand and left-hand walls of the box 24A. The shaft 27 has a through hole through which a cord 30 with a jack 29 which can be connected to the auxiliary video camera 16 is inserted. The auxiliary video camera 16 is connected via the cord 30 to an electric circuit provided inside the stage 11. A cord take-up reel (not shown) is provided in the stage 11.

The casing 26 is pivotally movable between a position at which the auxiliary video camera 16 accommodated in the casing is further accommodated in the box 24A as shown in FIG. 5 and another position at which the auxiliary video camera 16 stands from the box 24A such that lens thereof is directed to the front of the stage 11 as shown in FIGS. 2, 3 and 6. The casing 26 is held at the accommodated and standing positions by frictional resistance of the shafts 27 and 28. A stopper (not shown) is provided near the shaft 28 for positioning the casing 26 at the standing position.

Figure 8:
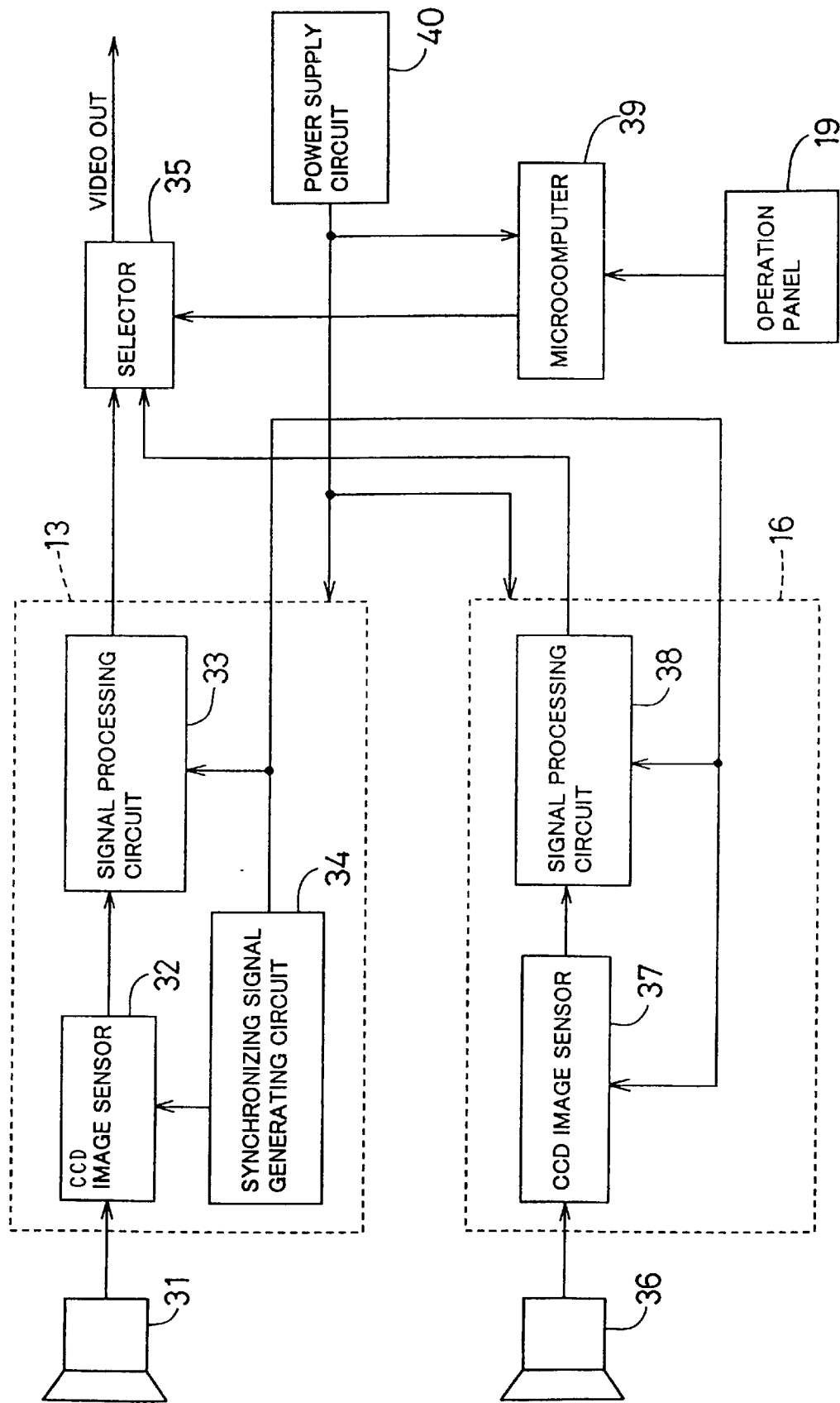
FIG. 8 is an electrical arrangement of the image pickup apparatus.

Referring to FIG. 8, an electrical arrangement of the image pickup apparatus 10 is schematically shown. The main video camera 13 comprises a lens 31, a CCD image sensor 32, and a known signal processing circuit 33 converting a photoelectric signal delivered by the CCD image sensor 32 to a corresponding video image signal. The main video camera 13 further comprises a synchronizing signal generating circuit 34 delivering a synchronizing signal to a driver of the CCD image sensor 32. Video image signals representative of an object to be taken or shot are delivered via a selector 35 provided in the stage 11 to an external image reproducing unit such as a television or video projector.

The auxiliary video camera 16 comprises a lens 36, a CCD image sensor 37 and a signal processing circuit 38. The CCD image sensor 37 Includes a driver to which the synchronous signal generating circuit 34 of the main video camera 13 is connected so that the synchronous signal is supplied thereto from the main video camera 13. Video image signals representative of the object are delivered via the selector 35 to external equipment.

The stage 11 is provided with control means 39 comprising a microcomputer as well as the selector 35. The control means 39 controls the selector 35 so that the video image signals from the main video camera 13 or the auxiliary video camera 16 are selectively delivered to the external equipment in response to the operation of the switches on the operation panel 19. The stage 11 is further provided with a power supply circuit 40 supplying power to the main video camera 13, the auxiliary vide camera 16, the control means 39, etc. The cord 30 connecting between the auxiliary video camera 16 and the interior of the stage 11 includes a wiring connecting between the synchronizing signal generating circuit 34 of the main video camera 13 and the auxiliary video camera 16, a wiring connecting between the auxiliary video camera 16 and the power supply circuit 40, and a wiring connecting between the auxiliary video camera 16 and the selector 35.

The column 12 has a vertical two-stage structure and includes a lower column 12A and an upper column 12B. Two rotating mechanisms 41 and 42 are provided in a root of the lower column 12A and a connection of the lower and upper columns 12A and 12B respectively. The lower column 12A is mounted on the stage 11 so as to be vertically rotated by the lower rotating mechanism 41. The upper column 12B is mounted on the lower column 12A so as to be vertically rotated by the upper rotating mechanism 42.

Figure 9:
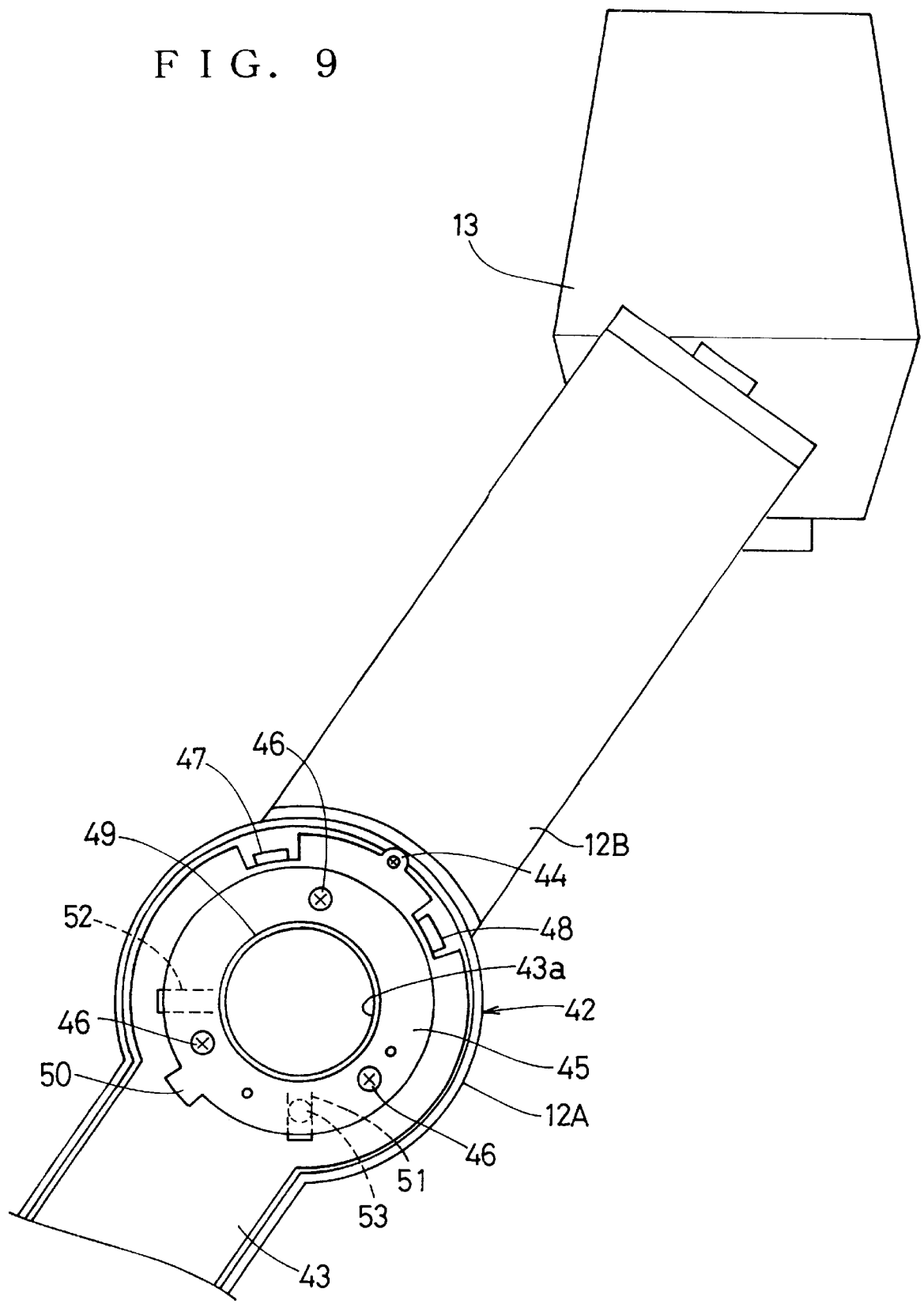
FIG. 9 is a partially broken inner structure of the upper rotating mechanism.

Referring to FIG. 9, the inner structure of the upper rotating mechanism 42 is shown. A frame 43 having a circular distal end is fixed to the inside of the lower column 12A by a small screw 44. A ring frame 45 is fixed to the inside of the upper column 12B by a small screw 46. The frame 43 has a central aperture 43a and two bent engagement strips or tabs 47 and 48 formed on an outer circumferential face thereof. The frame 45 has an integrally formed cylindrical shaft 49 rotatably fitted in the central aperture 43a of the frame 43. The frame 45 further has an engaging strip 50 formed on the outer circumference thereof so as to engage selectively the engagement strip 47 or 48. The frame 43 has two detent recesses 51 and 52 constituting a detent mechanism. A detent ball 53 and a detent spring (not shown) urging the detent ball are interposed between the frames 43 and 45.

The detent recess 51 is disposed to position the upper column 12B at a first position as shown in FIGS. 1 and 3 relative to the lower column 12A. When assuming the first position, the upper column 12B extends upward from the upper end of the lower column 12B substantially straightforward, so that the main video camera 13 mounted on the upper column 12B is held at such a position that the lens 31 thereof is directed toward the central portion of the stage 11. The other detent recess 52 is disposed to position the upper column 12B at a second position as shown in FIG. 2 relative to the lower column 12A. When assuming the second position, the upper column 12B is at right angles to the lower column 12A and the lens 31 of the main video camera 13 is directed in the rear of the stage 11.

The engagement strip 47 of the frame 43 is disposed so as to abut the engaging strip 50 when the main video camera 13 assuming the second position is downwardly rotated a slight angle, whereupon further rotation of the main vide camera 13 is prevented The other engagement strip 48 is disposed so as to abut the engaging strip 50 when the upper column 12B is rotated, whereby the upper column 12B is positioned at a third position where the upper column 12B is folded relative to the lower column 12A as shown in FIG. 4. The lower and upper columns 12A and 12B, and the main video camera 13 are dimensioned and configured so as not to protrude outside the stage 11 in the folded state of the column 12. The lower rotating mechanism 41 is provided with a locking mechanism (not shown) for locking the lower column 12A at a position where it stands from the stage 11 as shown in FIGS. 1 to 3 or a lying position where it is lying along the stage 11 as shown in FIG. 4.

In use of the image pickup apparatus, the arm 14 is pivoted to stand and locked in position as shown in FIG. 1 when images of the material such as a figure placed on the stage 11 are reproduced by an external television or the like. The external illumination lamps 15 are located obliquely over the stage 11 outside the same. The lower column 12A is caused to stand and locked. The upper column 12B is rotated to extend upwardly straightforward from the lower column 12A and then held at the first position by the detent mechanism. As a result, the lens 31 of the main video camera 13 is directed to the material on the stage 11. The attached small-sized monitor television 20 is fixed at the corner of the stage 11 by the bracket 21 and the screw 22 so as to stand therefrom. Thus, the image pickup apparatus 10 is ready for shooting.

The main switch 23 is then turned on and the switches 18 on the operation panel 19 are depressed so that the main video camera 13 operates to shoot the material on the stage 11. The video image signals delivered by the main video camera 13 are supplied via the external output terminal of the selector 35 to the external television to be reproduced. The video image signals are also. supplied via the external output terminal of the selector 35 to the monitor television 20 mounted on the stage 11 to be reproduced. Consequently, the images shot by the main video camera 13 can be confirmed.

When an object located in the rear of the stage 11 is shot, the upper column 12B is rotated so that the lens of the main video camera 13 is directed to the rear of the stage 11 as shown in FIG. 2. The upper column 12B is then held at the second position by the detent mechanism.

When the operator in front of the stage 11 is shot, the cover 25 is opened and the casing 26 is rotated so that the auxiliary vide camera 16 is caused to stand from the recess 24, whereby the lens of the auxiliary video camera 16 is directed to the front side of the stage 11. The switches 18 of the operation panel 19 are depressed to operate the auxiliary video camera 16, so that the video image signals delivered by the auxiliary video camera 16 are supplied via the selector 35 to the external television etc. and the monitor television 20.

When an object is placed by the side of the stage 11, it cannot be shot by the main video camera 13. In such a case, too, the auxiliary video camera 16 is used. However, the auxiliary video camera 16 is detached from the casing 26 and the cord 30 is extended so that the auxiliary video camera 16 is taken out of the recess 24 and then directed to the object.

The auxiliary video camera 16 is accommodated in the recess 24 and the cover 25 is closed as shown in FIG. 4 when the image pickup apparatus 10 is not used. The lower column 12A is brought down to lie along the stage 11 and then locked in position. The upper column 12B is rotated rearward so as to be positioned at the third position by the engaged strip 48 and the engaging strip 50 and then folded. Furthermore, the arms 14 are brought down and the external illumination lamps 15 are brought down inside the stage 11. Thus, the image pickup apparatus 10 can compactly be folded.

According to the above-described image pickup apparatus 10, the main video camera 13 can be held at the predetermined height over the central portion of the stage when the lower column 12A is caused to stand and the upper column 12B is extended straightforward. Furthermore, the upper column 12B is rotated to the position at which it is bent substantially at right angles to the lower column 12A, so that the object located in the rear of the stage 11 can be shot by the main vide camera 13. Furthermore, the lower column 12A is caused to lie along the stage 11 and the upper column 12B is folded relative to the lower column 12A, so that the image pickup apparatus 10 can compactly be folded. The lower rotating mechanism 41 rotates the lower column 12A relative to the stage 11, and the upper rotating mechanism 42 rotates the upper column 12B relative to the lower column 12A. As the result of provision of these rotating mechanisms 41 and 42, the object located in the rear of the stage 11 can be shot by the main video camera 13. Furthermore, these rotating mechanisms 41 and 42 permit the apparatus 10 to be compactly folded. Consequently, the construction of the apparatus 10 can be simplified and the manufacturing cost can be reduced.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. An image pickup apparatus consisting of:

a stage on which a material is placed;

a video camera including a shooting lens and shooting an image of the material placed on the stage, thereby obtaining an image signal representative of the material, the image signal being delivered to an image reproducing equipment;

a column for supporting the video camera so that the video camera is located over a central portion of the stage, the column being formed into a vertical two-stage structure including an upper column and a lower column, the upper column having a distal end to which the video camera is fixed, the lower column being mounted on the stage so as to be moved between a standing position where the lower column stands from the stage and a lying position where the lower column is lying along the stage, the upper column being rotatably mounted on the lower column;

first positioning means for positioning the upper column at a first position where the upper column extends substantially straightforward from the lower column;

second positioning means for positioning the upper column at a second position where the upper column is bent approximately at right angles to the lower column; and third positioning means for positioning the upper column at a third position where the upper column is folded into two parts relative to the lower column;

wherein the lens of the video camera is directed toward the central portion of the stage when the lower column is positioned at the standing position and the upper column is positioned at the first position;

wherein the lens of the video camera is directed toward the rear of the stage when the lower column is positioned at the standing position and the upper column is positioned at the second position; and wherein the video camera is lying along the stage when the lower column is positioned at the lying position and the upper column is positioned at the third position.

2. An image pickup apparatus according to claim 1, wherein the lower column is mounted on a corner of the stage.

3. An image pickup apparatus according to claim 2, which further consists of a pair of arms mounted on rear opposite corners of the stage respectively, each arm having a proximal end moved between a standing position and a folded position, and a pair of external illumination lamps fixed on the distal ends of the arms for illuminating the material on the stage, respectively, and wherein each external lamp is located over and outside the stage when each arm is positioned at the standing position and each external lamp is lying along the stage when each arm is positioned at the folded position.

* * * * *